US007822751B2

(12) United States Patent
O'Clair et al.

(10) Patent No.: US 7,822,751 B2
(45) Date of Patent: Oct. 26, 2010

(54) SCORING LOCAL SEARCH RESULTS BASED ON LOCATION PROMINENCE

(75) Inventors: Brian O'Clair, New York, NY (US); Daniel Egnor, New York, NY (US); Lawrence E. Greenfield, Brooklyn, NY (US)

(73) Assignee: Google Inc., Mountain View, CA (US)

( * ) Notice: Subject to any disclaimer, the term of this patent is extended or adjusted under 35 U.S.C. 154(b) by 287 days.

(21) Appl. No.: 11/138,670

(22) Filed: May 27, 2005

(65) Prior Publication Data
US 2006/0271531 A1 Nov. 30, 2006

(51) Int. Cl.
G06F 17/30 (2006.01)
G06F 11/34 (2006.01)

(52) U.S. Cl. .................................. 707/748; 705/11
(58) Field of Classification Search ................ 707/1, 707/2, 3, 4, 5, 6, 10; 705/1, 5, 10, 14, 26
See application file for complete search history.

(56) References Cited

U.S. PATENT DOCUMENTS

| 5,930,474 | A | | 7/1999 | Dunworth et al. | |
|---|---|---|---|---|---|
| 5,983,227 | A | * | 11/1999 | Nazem et al. | ................ 707/10 |
| 6,393,415 | B1 | | 5/2002 | Getchius et al. | |
| 6,625,595 | B1 | * | 9/2003 | Anderson et al. | ............. 707/3 |
| 6,659,873 | B1 | * | 12/2003 | Kitano et al. | ............... 463/42 |
| 6,697,799 | B1 | * | 2/2004 | Neal et al. | .................... 707/3 |
| 6,778,980 | B1 | | 8/2004 | Madan et al. | |
| 6,823,333 | B2 | | 11/2004 | McGreevy | |
| 6,904,429 | B2 | | 6/2005 | Sako et al. | |
| 7,043,492 | B1 | * | 5/2006 | Neal et al. | .................. 707/101 |
| 7,117,199 | B2 | * | 10/2006 | Frank et al. | .................... 707/3 |
| 7,185,088 | B1 | * | 2/2007 | Joy et al. | ................... 709/224 |
| 7,249,126 | B1 | | 7/2007 | Ginsburg et al. | |
| 2002/0078035 | A1 | * | 6/2002 | Frank et al. | .................... 707/3 |
| 2002/0129014 | A1 | * | 9/2002 | Kim et al. | ...................... 707/5 |
| 2002/0156779 | A1 | * | 10/2002 | Elliott et al. | .................. 707/6 |
| 2003/0033299 | A1 | * | 2/2003 | Sundaresan | .................... 707/5 |
| 2003/0061211 | A1 | | 3/2003 | Shultz et al. | |
| 2004/0034635 | A1 | * | 2/2004 | Czarnecki et al. | ............. 707/7 |
| 2004/0243569 | A1 | | 12/2004 | Burrows | |

(Continued)

FOREIGN PATENT DOCUMENTS

EP 1 359 519 A2 11/2003

(Continued)

OTHER PUBLICATIONS

U.S. Appl. No. 11/139,032, filed May 27, 2005 entitled "Using Boundaries Associated with a Map View for Business Location Searching" by Brian O'Clair, 29 pages.

(Continued)

*Primary Examiner*—Neveen Abel Jalil
*Assistant Examiner*—Tarek Chbouki
(74) *Attorney, Agent, or Firm*—Harrity & Harrity, LLP

(57) ABSTRACT

A system may identify a first document associated with a geographic location within a geographical area and identify a second document associated with a geographic location outside the geographical area. The system may also assign a first score to the first document based on a first scoring function and assign a second score to the second document based on a second scoring function.

40 Claims, 12 Drawing Sheets

U.S. PATENT DOCUMENTS

| | | | |
|---|---|---|---|
| 2005/0015307 A1 | 1/2005 | Simpson et al. | |
| 2005/0060290 A1* | 3/2005 | Herscovici et al. | 707/3 |
| 2005/0065959 A1* | 3/2005 | Smith et al. | 707/102 |
| 2005/0091193 A1 | 4/2005 | Frank et al. | |
| 2005/0108213 A1 | 5/2005 | Riise et al. | |
| 2005/0182770 A1* | 8/2005 | Rasmussen et al. | 707/10 |
| 2005/0192946 A1 | 9/2005 | Lu et al. | |
| 2005/0240580 A1 | 10/2005 | Zamir et al. | |
| 2005/0283473 A1* | 12/2005 | Rousso et al. | 707/5 |
| 2006/0149734 A1 | 7/2006 | Egnor et al. | |
| 2006/0184523 A1* | 8/2006 | Israel et al. | 707/6 |

FOREIGN PATENT DOCUMENTS

| | | |
|---|---|---|
| WO | WO 01/27805 A2 | 4/2001 |
| WO | WO 01/65410 A2 | 9/2001 |
| WO | WO 2005/024667 A1 | 3/2005 |
| WO | WO 2005/031613 A1 | 4/2005 |

OTHER PUBLICATIONS

U.S. Appl. No. 11/340,857, filed Jan. 27, 2006 entitled "Local Search" by Jiang Qian et al., 28 pages.

Local Results Near Fairfax, VA 22030, http://search.msn.com/local/results.aspx?q=restaurant&w=Fairfax%2C+va+22030&FORM=QBXR pp. 1-2, printed on Apr. 27, 2006.

Yahoo!Local, Fairfax, http://local.yahoo.com/?csz=Fairfax%2C+VA+22030, pp. 1-2, printed on Apr. 27, 2006.

U.S. Appl. No. 11/340,857, filed Jan. 27, 2006 entitled "Improved Local Search", by Jiang Qian et al.; 28 pages.

Non-final Office Action from co-pending U.S. Appl. No. 11/340,857 dated May 27, 2008, 31 pages.

Final Office Action issued in U.S. Appl. No. 11/340,857 on Jan. 5, 2009, 29 pages.

International Search Report for corresponding PCT application; dated Nov. 20, 2006; 4 pages.

* cited by examiner

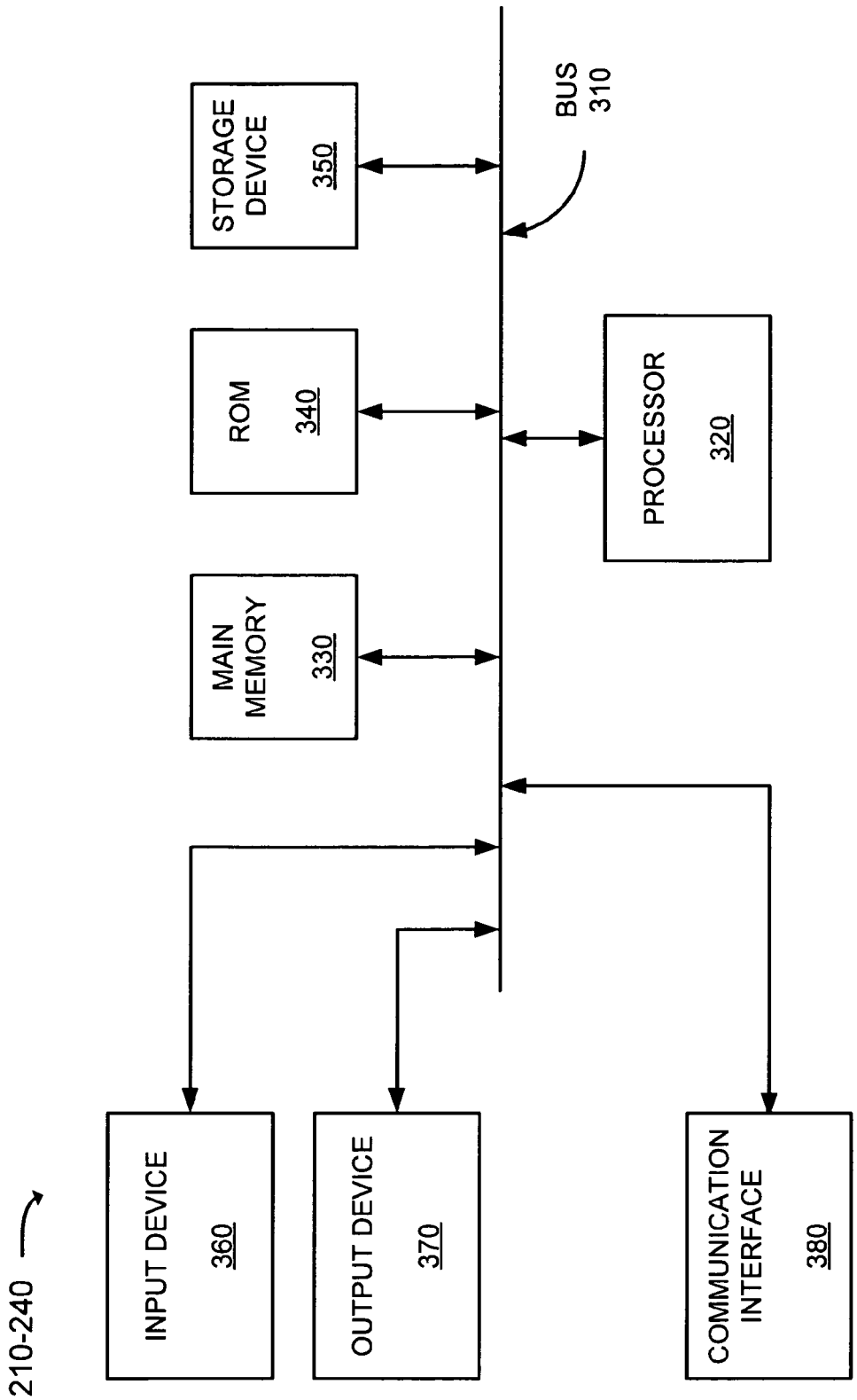

SCORING LOCAL SEARCH RESULTS BASED ON LOCATION PROMINENCE

BACKGROUND

1. Field of the Invention

Implementations described herein relate generally to information retrieval and, more particularly, to the scoring of local search results based on location prominence.

2. Description of Related Art

The World Wide Web ("web") contains a vast amount of information. Locating a desired portion of the information, however, can be challenging. This problem is compounded because the amount of information on the web and the number of new users inexperienced at web searching are growing rapidly.

Search engines attempt to return hyperlinks to web pages in which a user is interested. Generally, search engines base their determination of the user's interest on search terms (called a search query) entered by the user. The goal of the search engine is to provide links to high quality, relevant results (e.g., web pages) to the user based on the search query. Typically, the search engine accomplishes this by matching the terms in the search query to a corpus of pre-stored web pages. Web pages that contain the user's search terms are "hits" and are returned to the user as links.

Local search engines are search engines that attempt to return business listings and/or relevant web pages within a specific geographical area. For a local search, a user may enter a search query and specify a geographical area near which the search query is to be performed. The local search engine returns relevant results, such as listings of businesses in the geographical area and/or relevant web pages pertaining to the geographical area, to the user.

When scoring the results, a local search engine may identify a location within the geographical area. This identified location may be associated with the location of city hall, downtown, or a geographic center of the area. The local search engine identifies all business listings and/or web pages within a predetermined radius of the identified location. The local search engine may then identify those business listings and/or web pages that match the search query. The identified business listings and/or web pages are assigned scores according to their distance from the identified location and ranked based on their scores. If the user does not live near the identified location or is not interested in business listings and/or web pages near the identified location, the search results are not meaningful to the user.

Other local search engines may rank business listings and/or web pages alphabetically or alphabetically by town. Oftentimes, this type of ranking is not meaningful to the user.

SUMMARY

According to one aspect, a system may include means for identifying a first document associated with a geographic location within an area, means for identifying a second document associated with a geographic location outside the area, means for assigning a first score to the first document based on a first scoring function, and means for assigning a second score to the second document based on a second scoring function.

According to another aspect, a method may include receiving a search query, identifying a geographical area, identifying a document associated with a geographic location within the geographical area that is related to the search query, and assigning a score to the document based on a factor unrelated to the search query and unrelated to the geographical area.

According to yet another aspect, a system may include a memory to store instructions and a processor to execute the instructions to represent a geographical area by a set of postal codes allocated to the geographical area, determine a postal code associated with a document, determine whether the postal code is included in the set of postal codes associated with the geographical area, score the document based on a first scoring function when the postal code is included in the set of postal codes associated with the geographical area, and score the document based on a second scoring function when the postal code is not included in the set of postal codes allocated to the geographical area.

According to a further aspect, a system may include a memory to store instructions and a processor to execute the instructions to represent a geographical area by a set of latitude and longitude coordinates associated with the geographical area, determine a latitude and longitude coordinate associated with a document, determine whether the latitude and longitude coordinate is included in the set of latitude and longitude coordinates associated with the geographical area, score the document based on a first scoring function when the latitude and longitude coordinate is included in the set of latitude and longitude coordinates associated with the geographical area, and score the document based on a second scoring function when the latitude and longitude coordinate is not included in the set of latitude and longitude coordinates associated with the geographical area.

According to another aspect, a method may include assigning a score to a document based on a combination of two or more of a score associated with another document that is identified as authoritative for the document, a total number of documents referring to a business associated with the document, a highest score associated with the documents referring to the business, a total number of documents with reviews of the business, or a number of information documents that mention the business, and using the score to rank the document.

BRIEF DESCRIPTION OF THE DRAWINGS

The accompanying drawings, which are incorporated in and constitute a part of this specification, illustrate an embodiment of the invention and, together with the description, explain the invention. In the drawings.

FIG. 3 is an exemplary diagram of a client or server of FIG. 2 according to an implementation consistent with the principles of the invention;

DETAILED DESCRIPTION

The following detailed description of the invention refers to the accompanying drawings. The same reference numbers in different drawings may identify the same or similar elements. Also, the following detailed description does not limit the invention.

Overview

A local search system, consistent with the principles of the invention, may identify documents relevant to a geographical area based on their location prominence. Location prominence may refer to a score generated for a document based on one or more factors unrelated to the geographical area with which the document is associated, the searches performed by users, and/or the search queries provided by the users. As a result, the local search system may present search results that are more meaningful to the users.

Figure 1B:
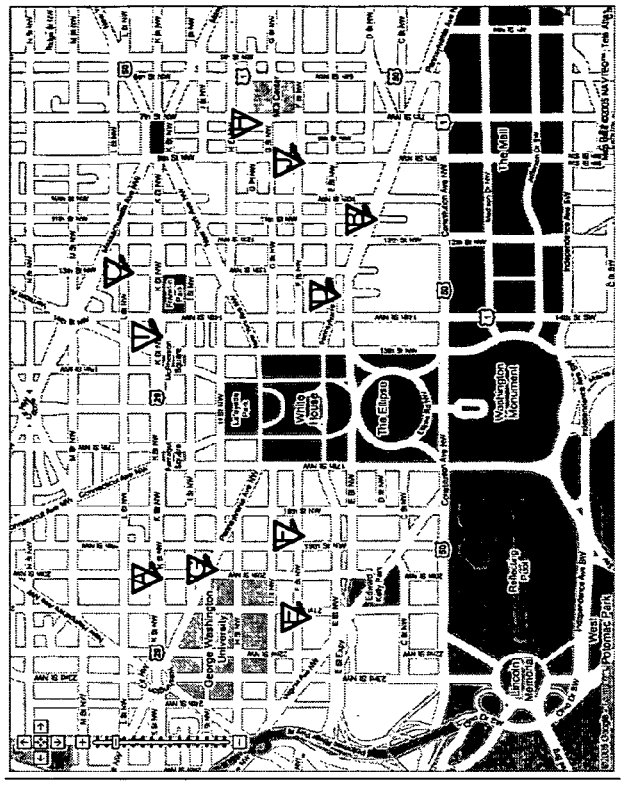
FIGS. 1A and 1B illustrate a concept consistent with principles of the invention.
Figure 1A:

FIGS. 1A and 1B illustrate a concept consistent with the principles of the invention. Assume that a user has performed a search for pizza restaurants in the Washington, DC area. FIG. 1A shows search results scored based on an existing technique. According to the existing technique, the search result documents are scored based on their distance from a particular location in Washington, DC. The lettered markers in FIG. 1A represent geographic locations associated with the documents and their scores, where marker A is scored the highest due to being closest to the particular location in Washington, DC.

FIG. 1B shows search results scored based on a technique consistent with the principles of the invention. According to this technique, the search result documents are scored based on their location prominence instead of, or in addition to, their distance from a particular location in Washington, DC. The lettered markers in FIG. 1B represent geographic locations associated with the documents and their scores, where marker A has obtained the highest location prominence score. Location prominence may use factors that are intended to convey the "best" documents for the geographical area rather than documents based solely on their distance from a particular location within the geographical area.

A "document," as the term is used herein, is to be broadly interpreted to include any machine-readable and machine-storable work product. A document may include, for example, a web site, a file, a combination of files, one or more files with embedded links to other files, a news group posting, a blog, a web advertisement, an e-mail, etc. In the context of local search, a common document is a business listing or a web page. Web pages often include textual information and may include embedded information (such as meta information, images, hyperlinks, etc.) and/or embedded instructions (such as Javascript, etc.). A "link," as the term is used herein, is to be broadly interpreted to include any reference to/from a document from/to another document or another part of the same document.

Exemplary Network Configuration

Figure 2:
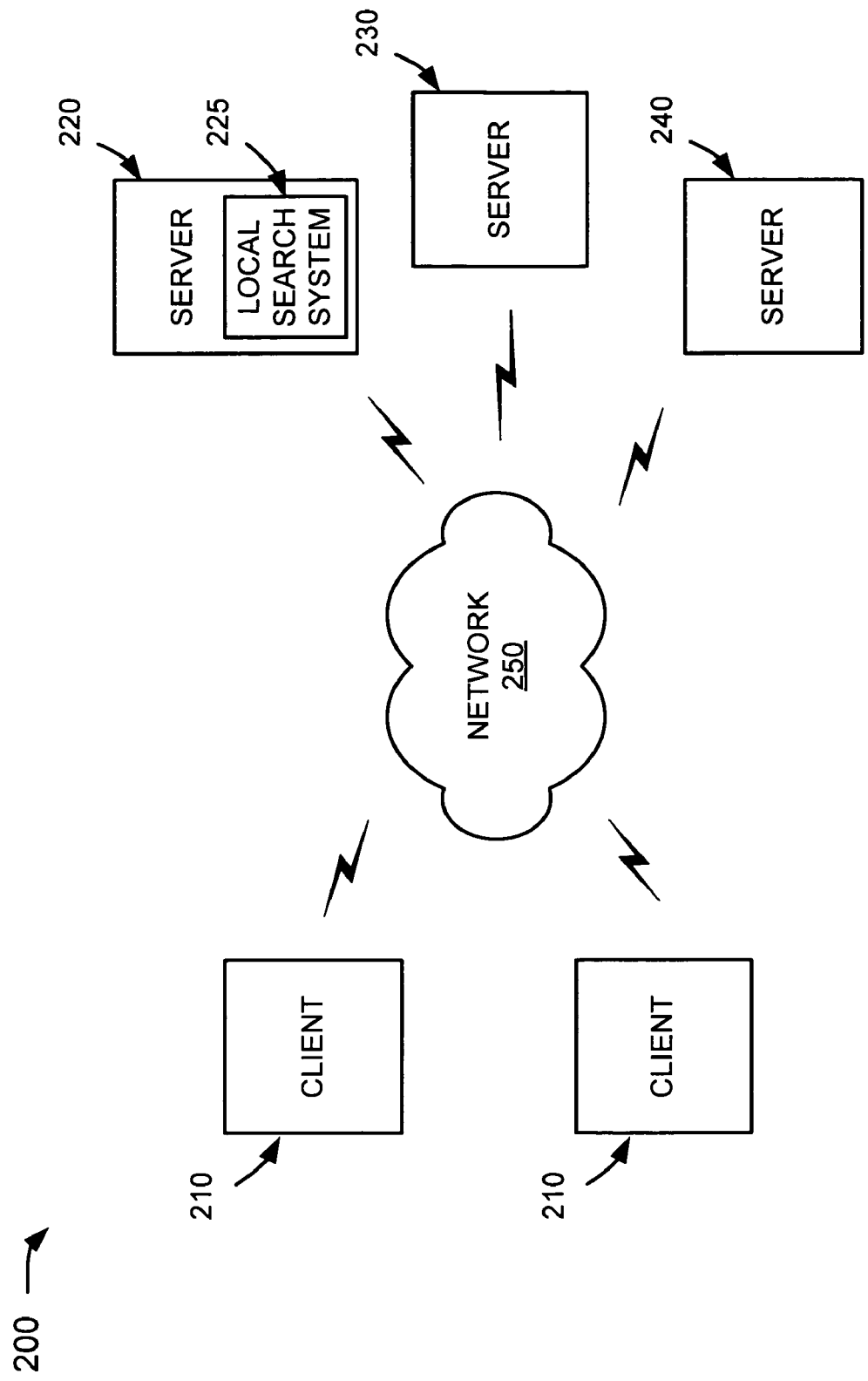
FIG. 2 is an exemplary diagram of a network in which systems and methods consistent with the principles of the invention may be implemented.

FIG. 2 is an exemplary diagram of a network 200 in which systems and methods consistent with the principles of the invention may be implemented. Network 200 may include multiple clients 210 connected to multiple servers 220-240 via a network 250. Two clients 210 and three servers 220-240 have been illustrated as connected to network 250 for simplicity. In practice, there may be more or fewer clients and servers. Also, in some instances, a client may perform the functions of a server and a server may perform the functions of a client.

Clients 210 may include client entities. An entity may be defined as a device, such as a personal computer, a wireless telephone, a personal digital assistant (PDA), a lap top, or another type of computation or communication device, a thread or process running on one of these devices, and/or an object executable by one of these devices. Servers 220-240 may include server entities that gather, process, search, and/or maintain documents in a manner consistent with the principles of the invention.

In an implementation consistent with the principles of the invention, server 220 may include a local search system 225 usable by clients 210. Server 220 may crawl a corpus of documents (e.g., web documents), index the documents, and store information associated with the documents in a repository of documents. Server 220 may, alternatively or additionally, gather information regarding businesses, index this information, and store it in a repository. Servers 230 and 240 may store or maintain documents that may be crawled or analyzed by server 220.

While servers 220-240 are shown as separate entities, it may be possible for one or more of servers 220-240 to perform one or more of the functions of another one or more of servers 220-240. For example, it may be possible that two or more of servers 220-240 are implemented as a single server. It may also be possible for a single one of servers 220-240 to be implemented as two or more separate (and possibly distributed) devices.

Network 250 may include a local area network (LAN), a wide area network (WAN), a telephone network, such as the Public Switched Telephone Network (PSTN), an intranet, the Internet, a memory device, or a combination of networks. Clients 210 and servers 220-240 may connect to network 250 via wired, wireless, and/or optical connections.

Exemplary Client/Server Architecture

FIG. 3 is an exemplary diagram of a client or server entity (hereinafter called "client/server entity"), which may correspond to one or more of clients 210 and/or servers 220-240, according to an implementation consistent with the principles of the invention. The client/server entity may include a bus 310, a processor 320, a main memory 330, a read only memory (ROM) 340, a storage device 350, an input device 360, an output device 370, and a communication interface 380. Bus 310 may include a path that permits communication among the elements of the client/server entity.

Processor 320 may include a conventional processor, microprocessor, or processing logic that interprets and executes instructions. Main memory 330 may include a random access memory (RAM) or another type of dynamic storage device that may store information and instructions for execution by processor 320. ROM 340 may include a conventional ROM device or another type of static storage device that may store static information and instructions for use by processor 320. Storage device 350 may include a magnetic and/or optical recording medium and its corresponding drive.

Input device 360 may include a conventional mechanism that permits an operator to input information to the client/server entity, such as a keyboard, a mouse, a pen, voice recognition and/or biometric mechanisms, etc. Output device 370 may include a conventional mechanism that outputs information to the operator, including a display, a printer, a speaker, etc. Communication interface 380 may include any transceiver-like mechanism that enables the client/server entity to communicate with other devices and/or systems. For example, communication interface 380 may include mechanisms for communicating with another device or system via a network, such as network 250.

As will be described in detail below, the client/server entity, consistent with the principles of the invention, may perform certain document processing-related operations. The client/server entity may perform these operations in response to processor 320 executing software instructions contained in a computer-readable medium, such as memory 330. A computer-readable medium may be defined as a physical or logical memory device and/or carrier wave.

The software instructions may be read into memory 330 from another computer-readable medium, such as data storage device 350, or from another device via communication interface 380. The software instructions contained in memory 330 may cause processor 320 to perform processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

Exemplary Processing

Figure 4A:
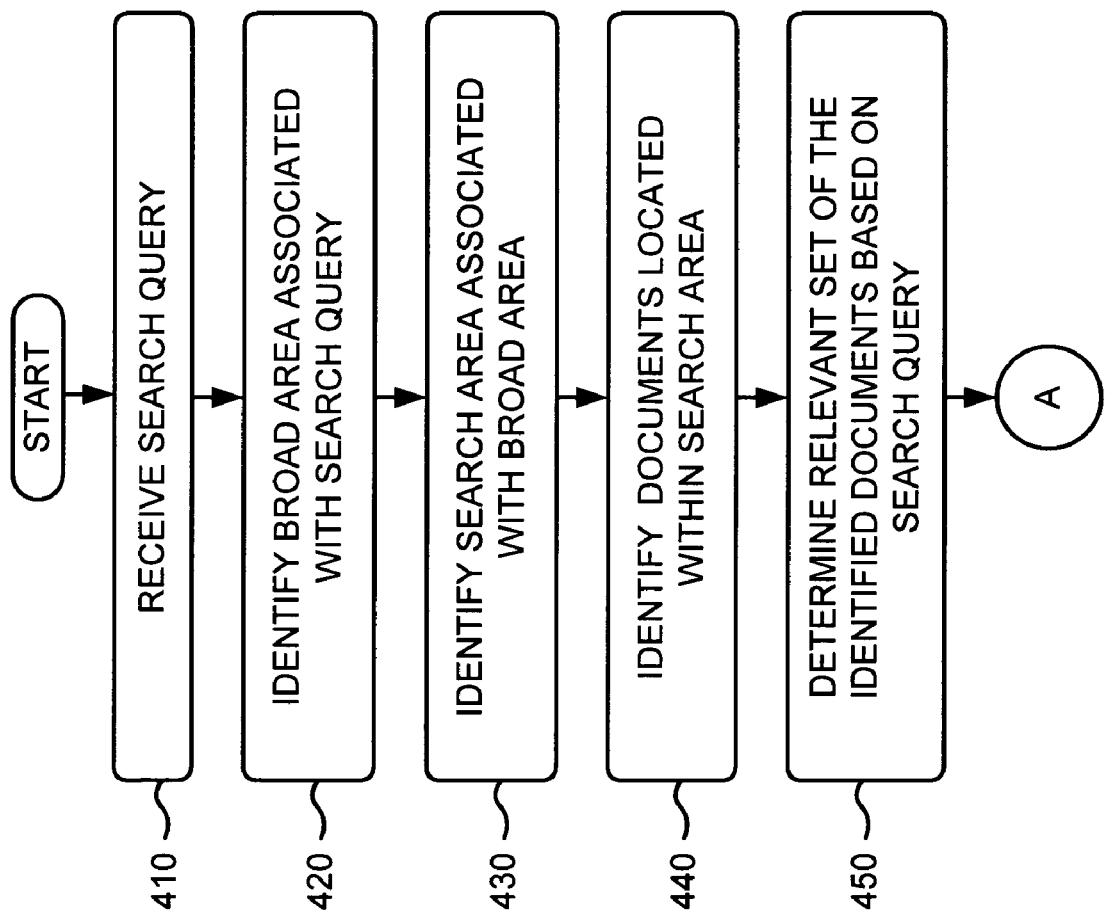
FIGS. 4A and 4B are flowcharts of exemplary processing for performing a local search according to an implementation consistent with the principles of the invention.
Figure 4B:
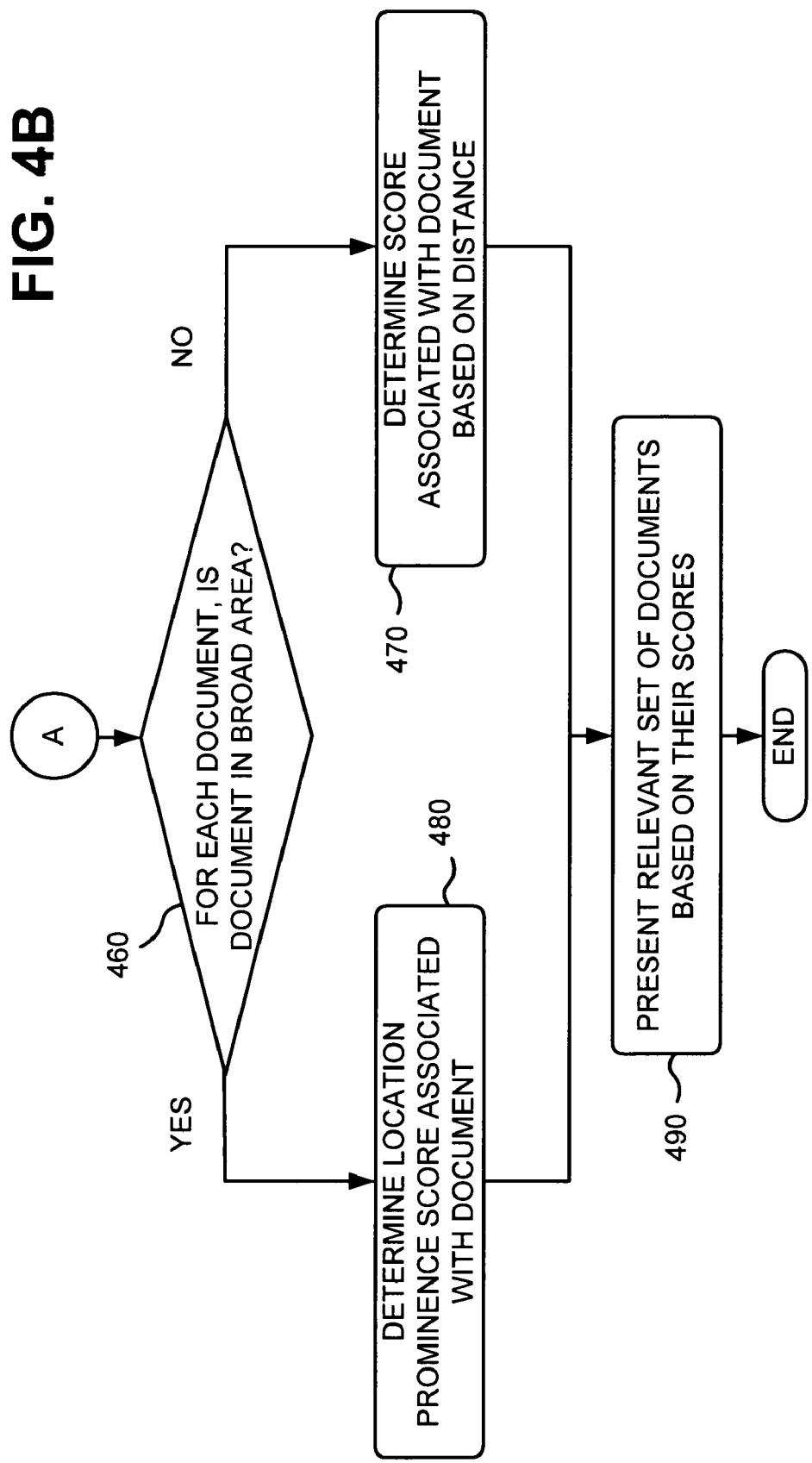

FIGS. 4A and 4B are flowcharts of exemplary processing for performing a local search according to an implementation consistent with the principles of the invention. In one implementation, the processing of FIGS. 4A and 4B may be performed by one or more software and/or hardware components within server 220. In another implementation, the processing may be performed by one or more software and/or hardware components within another device or a group of devices separate from or including server 220.

Processing may begin with the receipt of a search query (block 410) (FIG. 4A). In one implementation, a user may use a web browser associated with a client 210 to provide the search query. Assume that the search query relates to a local search. For example, the search query may include one or more search terms relating to a business listing. The search query may also optionally include information regarding a geographical area.

A broad area may be identified as being associated with the search query (block 420). The phrase "broad area" is intended to refer, for example, to any geographic location that is specified as an incomplete postal address (i.e., less than a full postal address). For example, any geographic location that is identified by less than a street name and street number can be considered a broad area. Accordingly, a broad area may include a city, a zip code, a street, a city block, a state, a country, a district, a county, a metropolitan area, a large area (e.g., Lake Tahoe area), a combination of areas (e.g., Sunnyvale and Mountain View), etc.

When the search query includes information regarding a geographical area, then the broad area may be identified from the search query. For example, if a search query includes the phrase "Mountain View," then the broad area may be identified as "Mountain View." A set of "zcodes" may be identified that correspond to the broad area. A "zcode" may refer to a postal code, such as a U.S. Postal Service zip code in the United States or something similar to a zip code outside the United States.

The set of zcodes corresponding to the broad area may include those zip codes that have been allocated to the geographical area associated with the broad area. For the Mountain View example above, assume that the set of zcodes includes the zip codes 94039, 94040, 94041, 94042, and 94043. To compress space, the zcode sets may be stored as a series of ranges. In the case of Mountain View, the zcode set may be stored as 94039:5, which corresponds to the zip code range of 94039 to 94043. If a zip code is unallocated to any other broad area, then it may be added to the range of a surrounding or adjacent zcode set. For example, if the zip code 94044 is unallocated, then it may be added to the Mountain View zcode set.

When the search query does not include information regarding a geographical area, then the broad area may be identified in another way. For example, when the user is accessing a map, the entire visible map area within the map window may be considered the broad area. In one implementation, the user may access a web site associated with a map provider, such as Google maps. The user might zoom in or zoom out on the map, move the map left or right, and/or provide an identifier relating to a geographical area of interest, as necessary, so that the broad area is within the map window. The interface provided by the map provider may also permit the user to enter the search query identified previously.

The latitude and longitude of the map window may define the broad area. For example, suppose that the upper corner of the map window is at latitude 37.557800, longitude—122.276031 and the lower corner of the map window is at latitude 38.557800, longitude—123.276031. The map window is then a box of height equal to a latitude of 1 and width equal to a longitude of 1.

A search area associated with the broad area may then be identified (block 430). In one implementation, a location within the broad area may be determined. This location may be associated with the location of city hall, a downtown area, a geographic center, or some other location within the broad area. A circle with a predetermined radius (e.g., 30 miles, 45 miles, 90 miles, etc.) may effectively be drawn around this location. The area of this circle may constitute the search area.

Documents that fall within the search area may be identified (block 440). For example, a corpus of documents may be searched to determine whether the documents fall within the search area. Each of the documents may be associated with a particular postal address and/or a latitude and longitude coordinate. A document's postal address and/or latitude and longitude coordinate may be used to determine whether it is located within a geographical area corresponding to the search area.

A relevant set of the identified documents may be determined based on the search query (block 450). For example, the documents that contain the term(s) of the search query in their title, content, and/or category string may be included in the relevant set. When the search query includes multiple terms, documents that contain the terms as a phrase, include all of the terms, but not necessarily together, contain less than all of the terms, or synonyms of the terms may be included in the relevant set.

It may then be determined for each document in the relevant set whether the document falls within the broad area (block 460) (FIG. 4B). As explained previously, each of the documents may be associated with a particular postal address and/or a latitude and longitude coordinate. When the broad area corresponds to a set of zcodes, it may be determined whether the zip code of the postal address associated with the document is included in the set of zcodes. When the document's zip code is included in the set of zcodes, then the document falls within the broad area. When the broad area corresponds to the visible area of a map window, it may be determined whether the latitude and longitude coordinate associated with the document is included within the latitude and longitude coordinates of the map window. When the document's latitude and longitude coordinate is included within the latitude and longitude coordinates of the map window, then the document falls within the broad area.

When the document does not fall within the broad area (block 460—NO), then a distance score associated with the document may be determined (block 470). In one implementation, the distance score associated with a document may be determined based on the distance the postal address and/or the latitude and longitude coordinate associated with the document is from the location within the broad area (e.g., the location representing the middle of the search area). As explained above, this location may be associated with the location of city hall, a downtown area, a geographic center, or some other location within the broad area. The distance score may have a value between zero and one depending on the distance from the location.

When the document falls within the broad area (block 460—YES), then a location prominence score associated with the document may be determined (block 470). The location prominence score may be based on a set of factors that are unrelated to the geographical area over which the user is searching. In one implementation, the set of factors may include one or more of the following factors: (1) a score associated with an authoritative document; (2) the total number of documents referring to a business associated with the document; (3) the highest score of documents referring to the business; (4) the number of documents with reviews of the business; and (5) the number of information documents that mention the business. In other implementations, the set of factors may include additional or different factors.

The score associated with an authoritative document may be used as a factor in determining the location prominence score for a document. An authoritative document may refer to a document that is identified as being authoritative for the business associated with the document for which the location prominence score is being determined. For example, a group of documents may refer to a business by mentioning the name of the business, the address of the business, and/or a telephone number associated with the business. One of the documents in the group may be more authoritative for the business than the other documents. For example, a document corresponding to the home page of a restaurant may be considered more authoritative for that restaurant than a document corresponding to a review of the restaurant. In one implementation, the link-based score of the authoritative document may be used as a factor in determining the location prominence score for a document associated with the business.

The total number of documents referring to a business associated with a document may be used as a factor in determining the location prominence score for the document. As explained above, a group of documents may refer to a business by mentioning the name of the business, the address of the business, and/or a telephone number associated with the business. In one implementation, the total number of these referring documents may be used as a factor in determining the location prominence score of a document associated with the business.

The highest score of documents referring to a business associated with a document may be used as a factor in determining the location prominence score for the document. As explained above, a group of documents may refer to a business by mentioning the name of the business, the address of the business, and/or a telephone number associated with the business. Each of these referring documents may have an associated link-based score. In one implementation, the highest link-based score of these referring documents may be used as a factor in determining the location prominence score of a document associated with the business.

The number of documents with reviews of a business associated with a document may be used as a factor in determining the location prominence score for the document. Reviews for businesses can appear in a number of documents, such as newspapers, magazines, web pages, and blogs. In one implementation, the number of documents with reviews of a business may be used as a factor in determining the location prominence score of a document associated with the business.

The number of information documents that mention a business associated with a document may be used as a factor in determining the location prominence score for the document. An information document may refer to a document that provides important information about a business, such as the address, telephone number, and/or hours of operation of the business, reviews and/or atmosphere of the business, whether the business accepts credit cards, etc. Examples of information documents may include Dine.com, Citysearch, and Zagat.com. In one implementation, the total number of information documents mentioning a business may be used as a factor in determining the location prominence score of a document associated with the business.

In one implementation, the location prominence score for a document may be determined by combining the above-identified factors. The factors may be combined and/or weighted in any manner. For example, the factors may be "squashed" and linearly combined. Squashing is a function that prevents one large signal from dominating the others. Some of the factors may also be normalized, if necessary, to have values between zero and one.

Optionally, the location prominence score for a document may be combined with a distance score for the document, where the combined scores will also be referred to herein as the location prominence score. As explained above, the distance score associated with a document may be determined based on the distance the postal address and/or the latitude and longitude coordinate associated with the document is from the location within the broad area (e.g., the location representing the middle of the search area). This factor may provide a better user experience by presenting the user with documents associated with businesses that are closer together rather than scattered apart.

In one implementation, the location prominence score (with or without the combined distance score) may be combined with a minimal value (e.g., one). This minimal value may ensure that documents that fall within the broad area are scored higher than documents that do not fall within the broad area. This may also ensure that the user is provided with relevant results in the geographical area of interest.

It may be possible to calculate the location prominence scores for documents in a document corpus beforehand. The location prominence scores may then be stored in a memory as metadata associated with the documents. In this case, determining the location prominence score for a document may include reading the score from memory.

The documents in the relevant set may then be presented based on their scores (block 490). For example, the documents may be sorted based on their scores. The sorted documents may then be presented possibly alongside a map that identifies a location associated with at least some of these documents.

EXAMPLE

Figure 5:
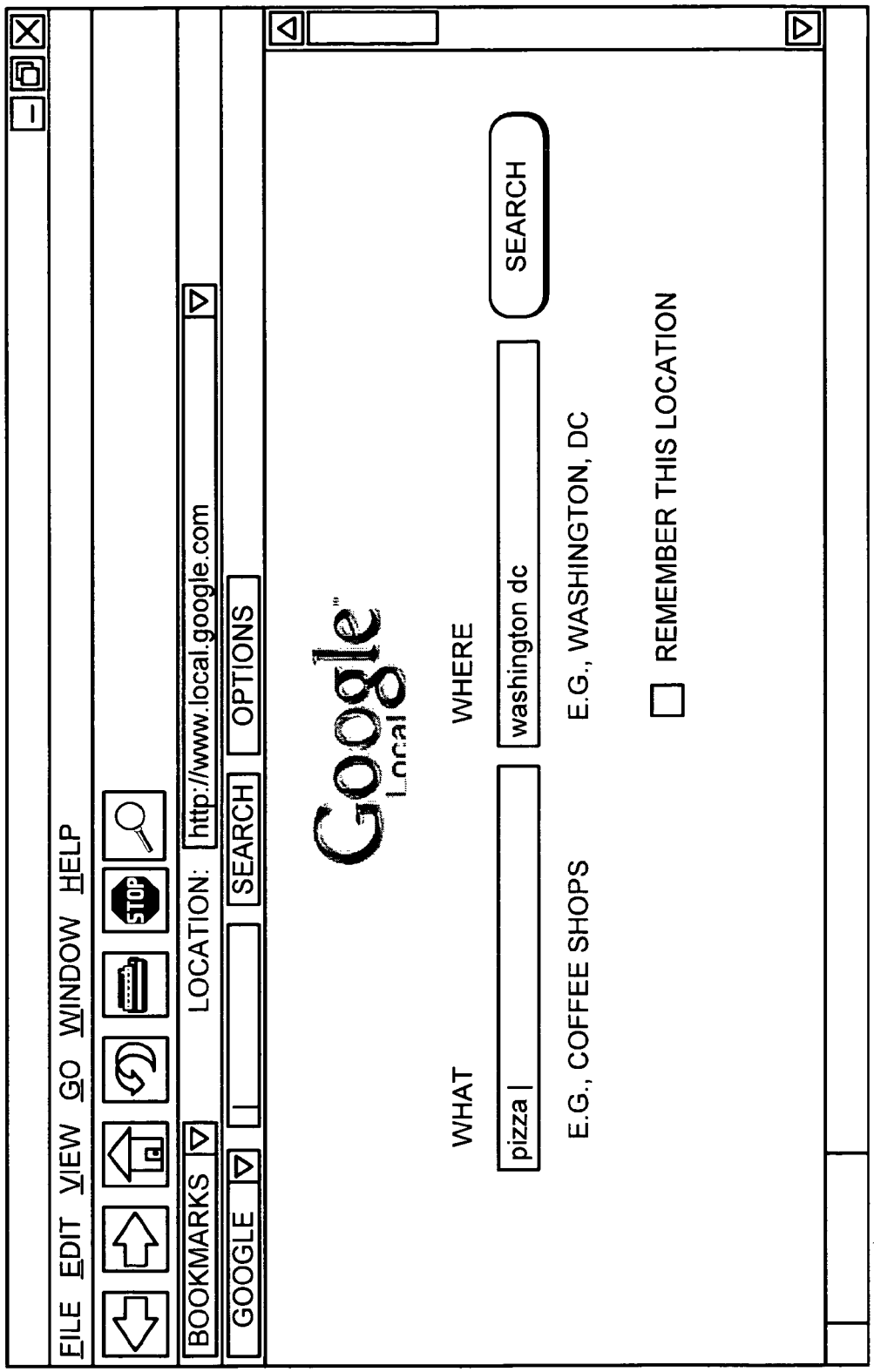
FIGS. 5-11 are diagrams of an exemplary local search that may be performed according to an implementation consistent with the principles of the invention.
Figure 6:
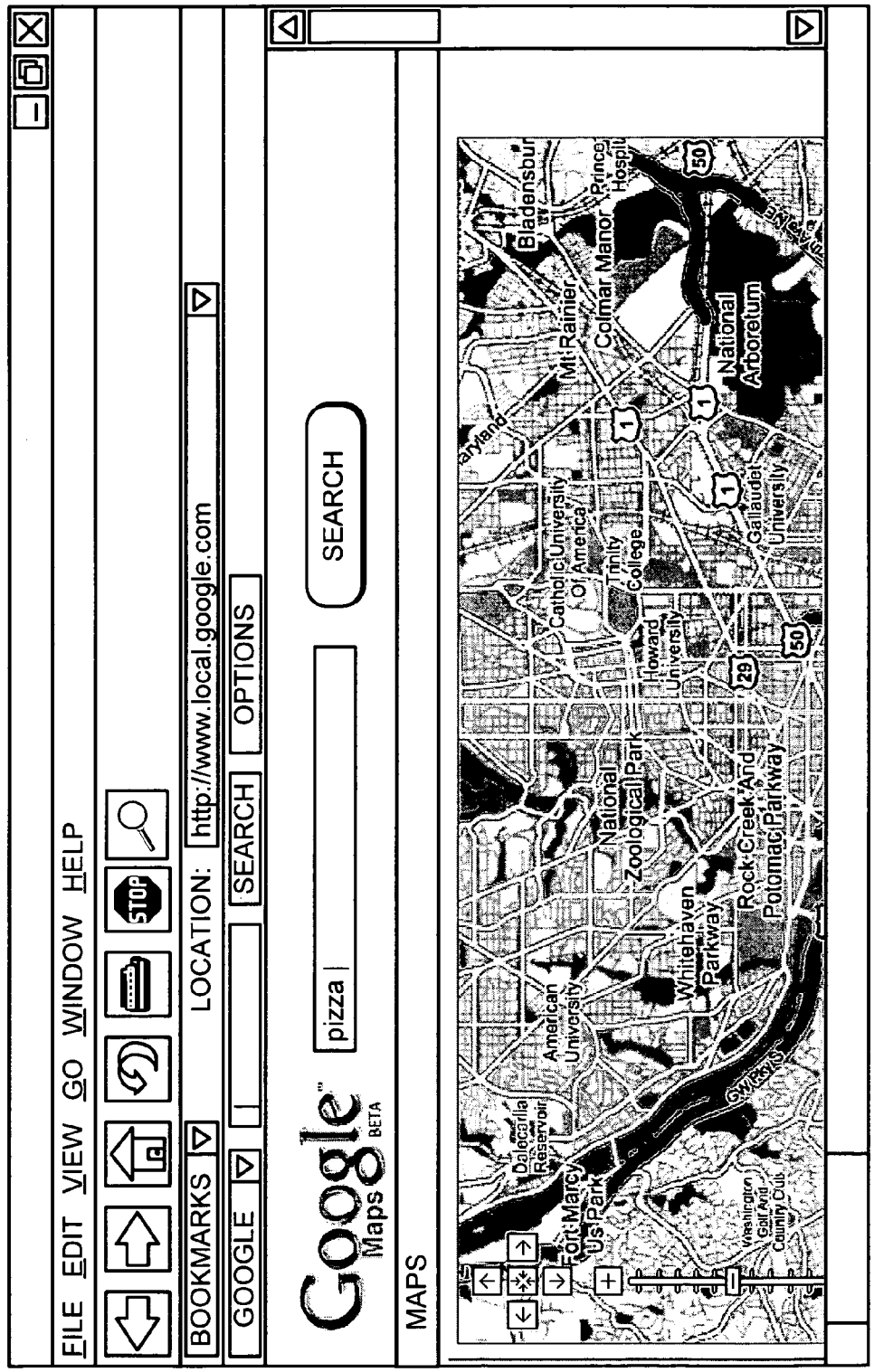

FIGS. 5-11 are diagrams of an exemplary local search that may be performed according to an implementation consistent with the principles of the invention. As shown in FIG. 5, a user enters a search for "pizza" in the "Washington DC" area via a local search engine interface. In this case, the user enters a search query and provides information regarding a geographical area. Alternatively, as shown in FIG. 6, the user enters a search for "pizza" while accessing a map of the Washington, DC area via a map provider interface. In this case, the user may first access a map of an area of interest to the user. The user may then perform a search relating to this area of interest.

Figure 7:
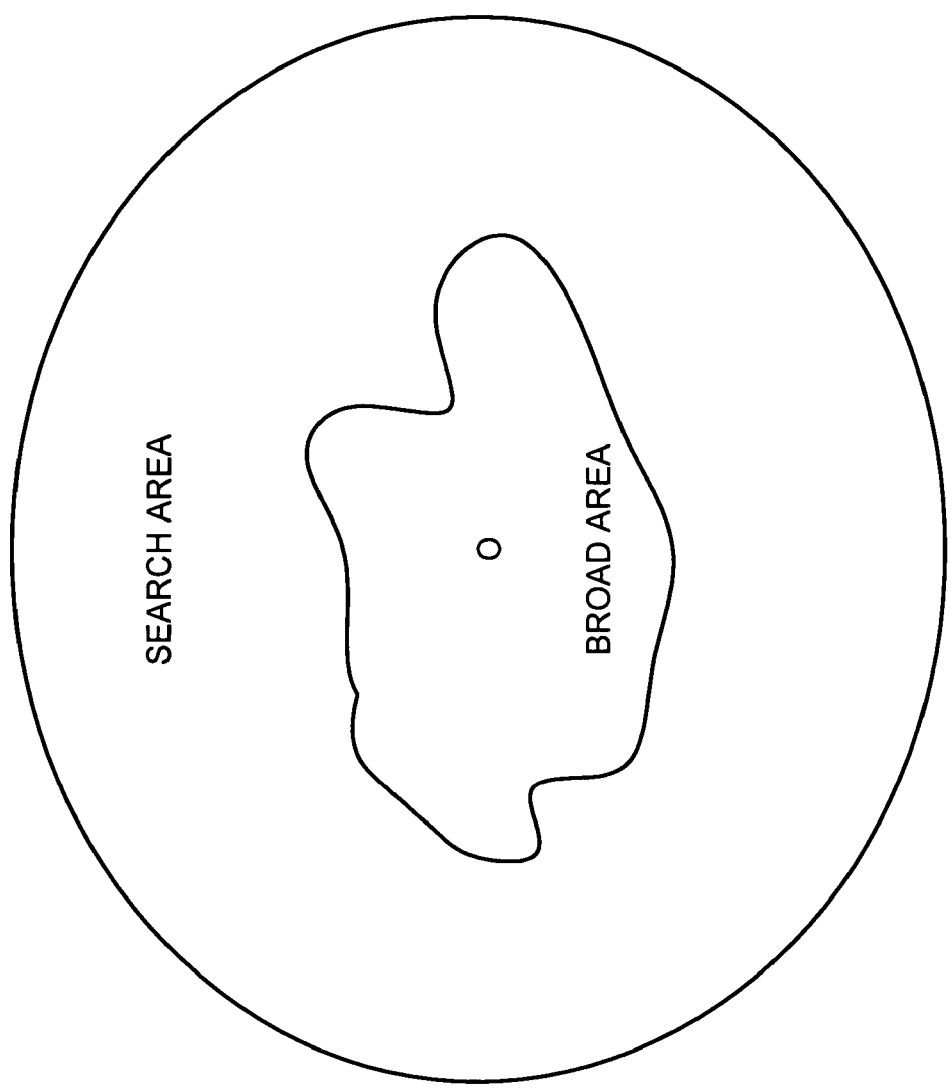

As shown in FIG. 7, a broad area may be identified as being associated with the search query. As described previously, the broad area may be identified from the search query (e.g., as shown in FIG. 5) or from the current map window accessed by the user (e.g., as shown in FIG. 6).

A search area associated with the broad area may then be identified. As shown in FIG. 7, a location within the broad area may be determined (shown as an "O" in FIG. 7). A circle with a predetermined radius may effectively be drawn around this location. The area of this circle may constitute the search area.

Figure 8:
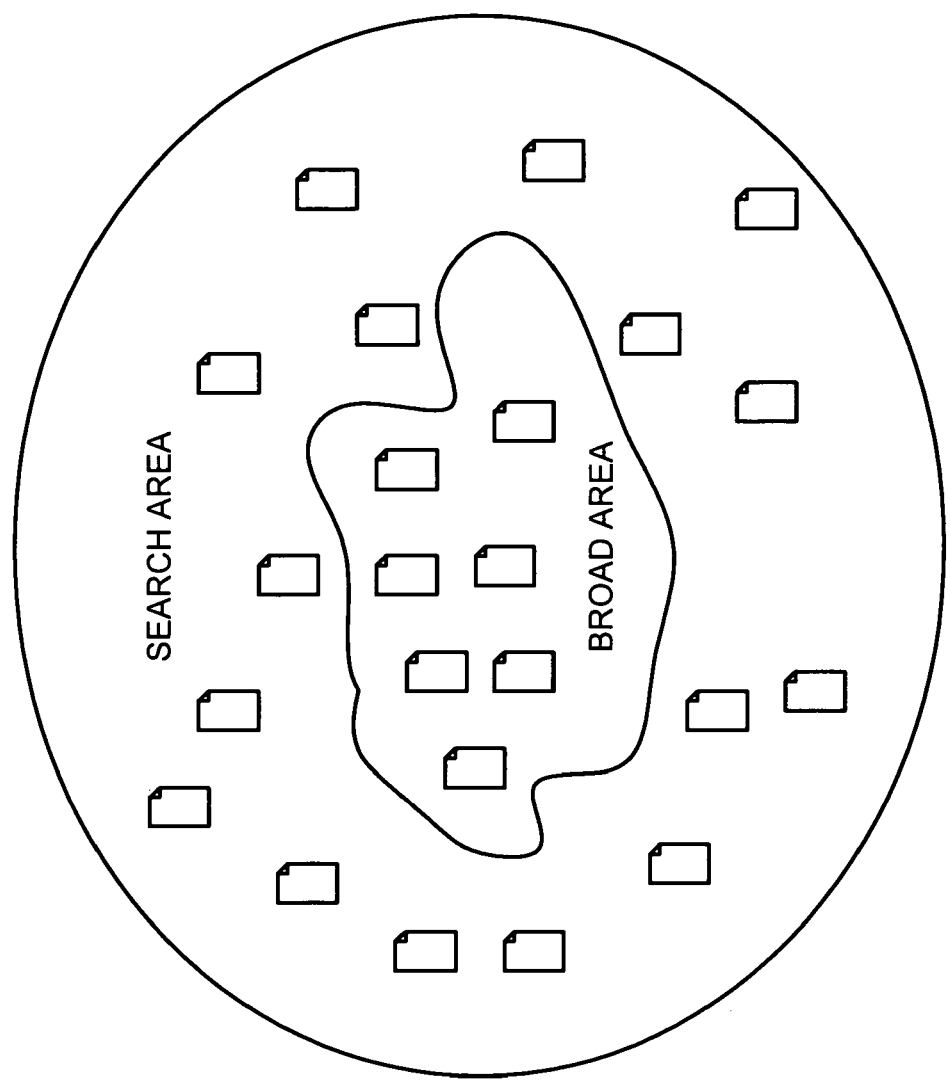

As shown in FIG. 8, a corpus of documents may be searched to identify documents that fall within the search area. Some of the documents identified by the search may fall within the broad area and others may fall outside the broad area.

Figure 9:
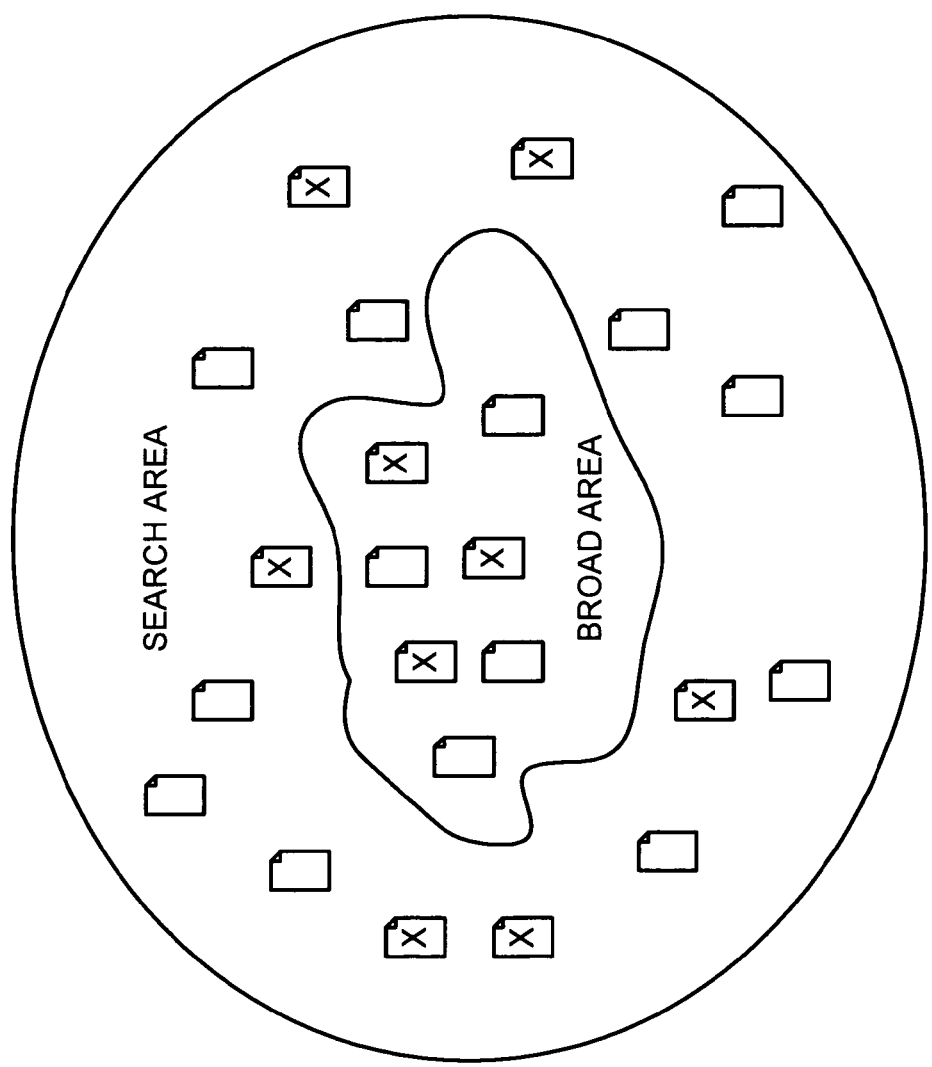

As shown in FIG. 9, the documents within the search area may be filtered based on the search query and documents that contain the term(s) of the search query in their title, content, and/or category string may be included in a relevant set of documents. The documents that contain the term(s) of the search query are identified in FIG. 9 with an "X."

Figure 10:
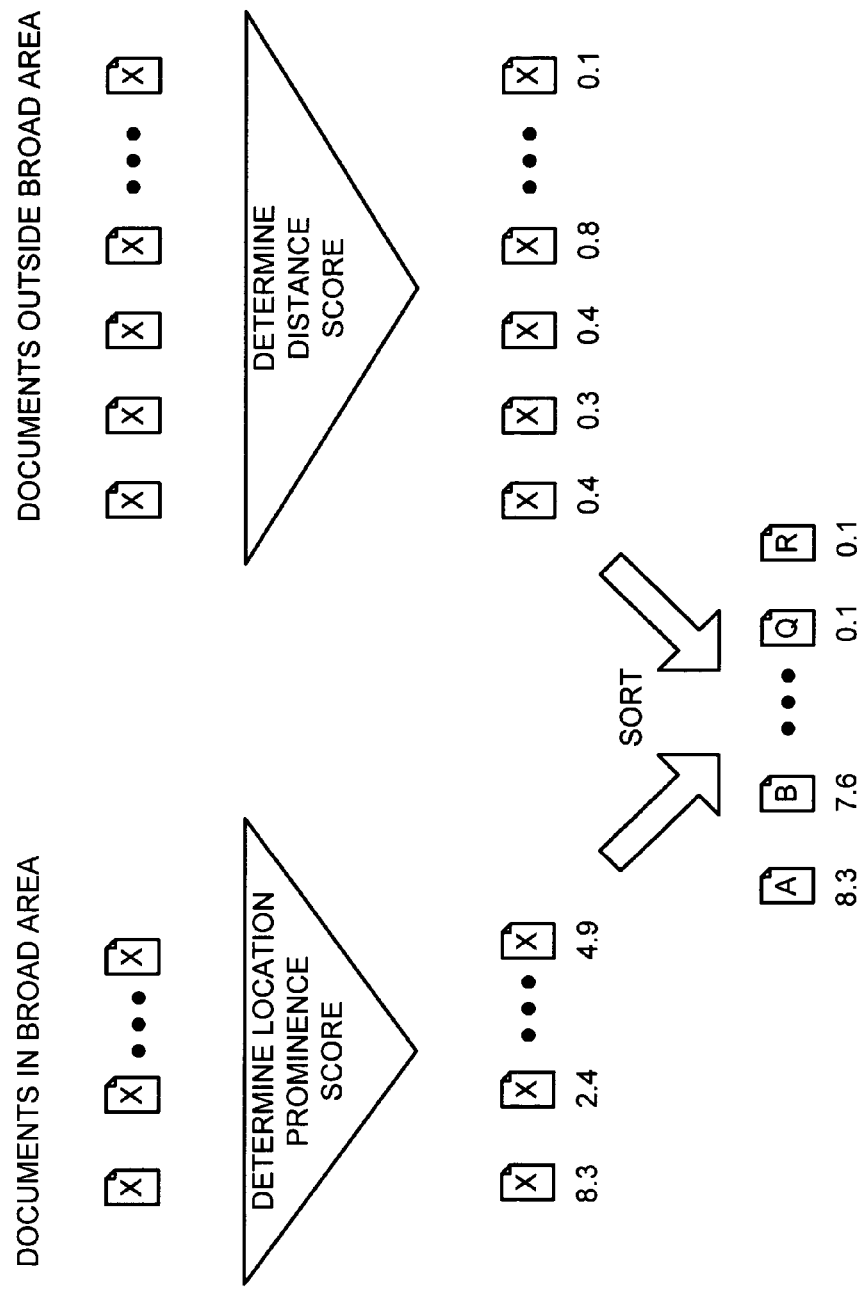

As shown in FIG. 10, documents that are located within the broad area may be scored differently from documents outside the broad area. Documents located within the broad area may be scored based on location prominence, as described above. Documents located outside the broad area may be scored based on distance, as also described above. The documents may be sorted and presented to the user in an order based on their scores.

Figure 11:
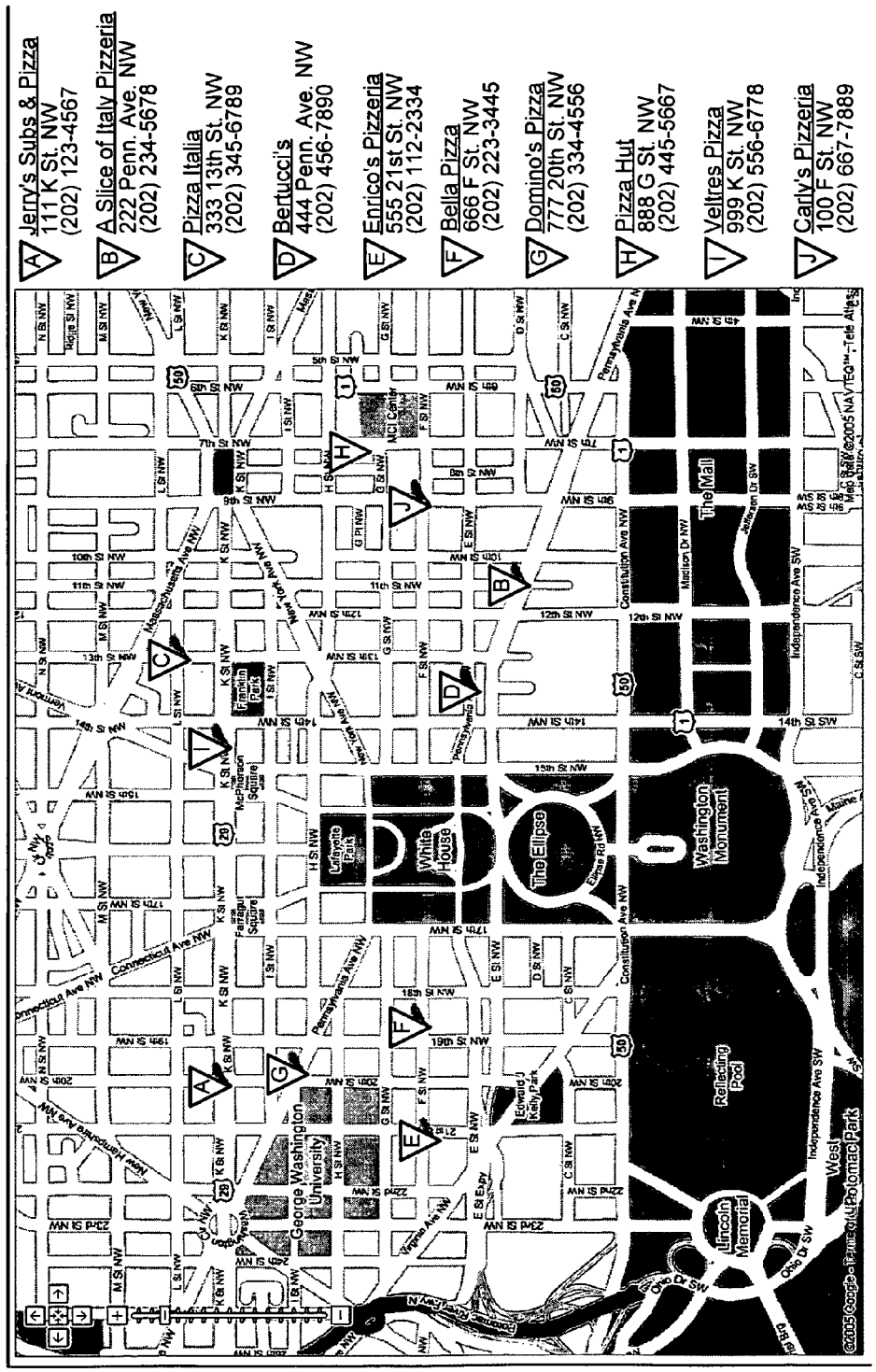

As shown in FIG. 11, the scored documents may be presented alongside a map window containing a map of the broad area, the search area, or a portion of the broad area and/or search area. For each document, there may be provided the name of the corresponding business, a link to information associated with the business (e.g., a business listing), and possibly other information, such as an address of the business and/or a telephone number associated with the business. It may be beneficial to provide further information, such as business hours, a link for directions, a link to reviews of the business, and other information that a user might find useful.

For at least some of the documents, a marker may be placed within the map window to show the location of the corresponding document. Optionally, if the user selects or places a cursor over one of the markers, more detailed information regarding the associated business may be presented.

As further shown in FIG. 11, a link 1100 may be provided to toggle on and off the location prominence feature. For example, if the user selects link 1100 when it says "Turn Off Location Prominence," then the location prominence feature may be turned off—meaning that all of the documents in the relevant set of documents are scored based on distance and none of them are scored based on location prominence. Alternatively, if the user selects link 1100 when it says "Turn On Location Prominence" (not shown), then the location prominence feature may be turned on—meaning that the documents in the relevant set of documents are scored based on location prominence as described above.

In another implementation, a more detailed interface may permit a user to do more than just turn on or off the location prominence feature. For example, the interface may permit the user to set his own function of various factors or to exclude certain factors. For example, the user might specify that he does not want information from Zagat.com to be used in determining the location prominence score.

Conclusion

Systems and methods consistent with the principles of the invention may identify documents relevant to a geographical area based on their location prominence instead of, or in addition to, their distance from a location within the geographical area. As a result, the systems and methods may present search results that are more meaningful to the users performing the searches.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

For example, while a series of acts has been described with regard to FIGS. 4A and 4B, the order of the acts may be modified in other implementations consistent with the principles of the invention. Further, non-dependent acts may be performed in parallel.

Also, exemplary user interfaces have been described with respect to FIGS. 5, 6, and 11. In other implementations consistent with the principles of the invention, the user interfaces may include more, fewer, or different pieces of information.

Further, it has been described that a location prominence score may be generated based on a set of factors that includes one or more of the following factors: a score associated with an authoritative document, the total number of documents referring to a business associated with the document, the highest score of documents referring to the business, the number of documents with reviews of the business, and the number of information documents that mention the business. In another implementation, the set of factors may include additional or different factors.

For example, one factor may relate to the numeric scores of the reviews (e.g., how many stars or thumbs up/down). Another factor might relate to some function (e.g., an average) of all the scores of the reviews. Yet another factor might relate to the type of document containing the review (e.g., a restaurant blog, Zagat.com, Citysearch, or Michelin). A further factor might relate to the types of language used in the reviews (e.g., noisy, friendly, dirty, best). Another factor might be derived from user logs, such as what businesses users frequently click on to get detailed information and/or for what businesses they obtain driving directions. Yet another factor might relate to financial data about the businesses, such as the annual revenue associated with the business and/or how many employees the business has. Another factor might relate to the number of years the business has been around or how long the business has been in the various listings. Yet other factors will be apparent to one skilled in the art.

It may also be possible to use the factors to train a model using machine learning techniques. The model may be used, for example, to determine the probability that a user might select a particular document in the search results.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects were described without reference to the specific software code—it being understood that one of ordinary skill in the art would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed by one or more server devices, comprising:
   receiving, by a processor associated with the one or more server devices, a search query;
   identifying, using a processor associated with the one or more server devices, a geographical area;
   identifying, using a processor associated with the one or more server devices, a first document that is associated with a first geographic location within the geographical area and that is related to the search query;
   identifying, using a processor associated with the one or more server devices, a second document that is associated with a second geographical location outside of the geographical area and that is related to the search query;
   assigning, using a processor associated with the one or more server devices, a first score to the first document based on a location prominence factor that is independent of the search query and independent of a measure of distance, where the location prominence factor is based on a combination of two or more of:
      a score associated with another document that is identified as authoritative for a business associated with the first document,
      a total number of documents referring to the business,
      a highest score associated with the documents referring to the business,
      a total number of documents with reviews of the business, or
      a quantity of documents that mention the business;
   assigning, using a processor associated with the one or more server devices, a second score to the second document based on a distance factor that is related to a measure of distance to or from a third geographic location within the geographical area and not based on the location prominence factor; and
   presenting, by a processor associated with the one or more server devices, information associated with the first and second documents, in a sorted list, based on the first and second scores, respectively.

2. The method of claim 1, where identifying the geographical area includes:
   receiving input regarding a map, and
   providing the map within a map window, where the geographical area represents a visible part of the map in the map window.

3. The method of claim 2, where identifying the geographical area further includes:
   identifying a set of latitude and longitude coordinates associated with the visible part of the map, and
   representing the geographical area by the set of latitude and longitude coordinates.

4. The method of claim 3, where identifying the first and second documents includes:
   determining first and second sets of latitude and longitude coordinates associated with the first and second documents, respectively, and
   determining whether each of the first and second sets of latitude and longitude coordinates is included in the set of latitude and longitude coordinates representing the geographical area.

5. The method of claim 1, where the combination of two or more includes the score associated with the other document that is identified as authoritative for the business associated with the first document.

6. The method of claim 1, where the combination of two or more includes the total number of documents referring to the business associated with the first document.

7. The method of claim 1, where the combination of two or more includes the highest score associated with documents referring to the business associated with the first document.

8. The method of claim 1, where the combination of two or more includes the total number of documents with reviews of the business associated with the first document.

9. The method of claim 1, where the combination of two or more includes the quantity of documents that mention the business associated with the first document.

10. The method of claim 1, where assigning the first score includes:
    determining the first score for the first document based on a combination of the location prominence factor and the distance factor.

11. A system, comprising:
    a memory to store instructions; and
    a processor to execute the instructions to:
       receive a search query,
       identify a first document and a second document based on the search query,
       determine a geographical area for the search query,
       represent the geographical area by a set of postal codes allocated to the geographical area,
       determine a first postal code associated with the first document and a second postal code associated with the second document,
       determine that the first postal code is included in the set of postal codes associated with the geographical area and that the second postal code is not included in the set of postal codes associated with the geographical area,
       score the first document based on a location prominence factor and a distance factor when the first postal code is included in the set of postal codes allocated to the geographical area, where the location prominence factor is independent of the search query and independent of the distance factor, where the distance factor is related to a measure of distance based on a geographic location associated with the geographical area, where the location prominence factor is based on a combination of two or more of:
          a score associated with another document that is identified as authoritative for a business associated with the first document,
          a total number of documents referring to the business,
          a highest score associated with the documents referring to the business,
          a total number of documents with reviews of the business,
          a quantity of documents that mention the business,
          a numeric score of a review of the business,

13 a function of a plurality of scores of reviews of the business,
a type of document containing a review of the business,
a type of language used in a review of the business, financial data associated with the business, or
a number of years that the business has been operational, score the second document based on the distance factor and not based on the location prominence factor when the second postal code is not included in the set of postal codes allocated to the geographical area, and rank the first document and the second document based on the scores of the first document and the second document.

12. The system of claim 11, where the combination of two or more includes at least one of:

the numeric score of a review of the business associated with the document,
the function of the plurality of scores of reviews of the business,
the type of document containing a review of the business, or
the type of language used in a review of the business.

13. The system of claim 11, where the combination of two or more includes:

the financial data associated with the business associated with the document, or the number of years that the business has been operational.

14. The system of claim 11, where the distance factor relates to a distance between a first geographic location associated with the first or second document and a second geographic location within the geographical area.

15. A system, comprising:
a memory to store instructions; and
a processor to execute the instructions to:
  receive a search query,
  identify a first document and a second document based on the search query,
  determine a geographical area for the search query,
  represent the geographical area by a set of latitude and longitude coordinates associated with the geographical area,
  determine a first latitude and longitude coordinate associated with the first document and a second latitude and longitude coordinate associated with the second document,
  determine that the first latitude and longitude coordinate is included in the set of latitude and longitude coordinates associated with the geographical area and that the second latitude and longitude coordinate is not included in the set of latitude and longitude coordinates associated with the geographical area,
  assign a first score to the first document based on a location prominence factor when the first latitude and longitude coordinate is included in the set of latitude and longitude coordinates associated with the geographical area, where the location prominence factor is independent of the search query, where the location prominence factor is based on a combination of two or more of:
    a score associated with another document that is identified as authoritative for a business associated with the first document,
    a total number of documents referring to the business,
    a highest score associated with the documents referring to the business,

14 a total number of documents with reviews of the business,
  a quantity of documents that mention the business,
  a numeric score of a review of the business,
  a function of a plurality of scores of reviews of the business,
  a type of document containing a review of the business,
  a type of language used in a review of the business,
  financial data associated with the business, or
  a number of years that the business has been operational, assign a second score to the second document based on a distance factor and not the location prominence factor when the second latitude and longitude coordinate is not included in the set of latitude and longitude coordinates associated with the geographical area, where the location prominence factor and the distance factor are different, and present information associated with the first document and the second document in a list of search results generated in response to the search query, where the first document is sorted within the list of search results based on the first score and the second document is sorted within the list of search results based on the second score.

16. The system of claim 15, where the processor is further to:

identify a location within the geographical area;
determine a search area with a predetermined radius centered on the identified location; and identify a plurality of documents associated with geographic locations within the search area.

17. The system of claim 16, where the processor is further to:

filter the plurality of documents based on the search query.

18. The system of claim 17, where when filtering the plurality of documents, the processor is to:

identify one or more of the plurality of documents that contain a term of the search query in a title, content, or category string associated with the identified one or more of the plurality of documents.

19. The system of claim 18, where the identified one or more of the plurality of documents include the first document and the second document.

20. The system of claim 15, where the combination of two or more includes the score associated with the authoritative document.

21. The system of claim 15, where the combination of two or more includes the total number of documents referring to the business associated with the first document.

22. The system of claim 15, where the combination of two or more includes the total number of documents with reviews of the business associated with the first document.

23. The system of claim 15, where the combination of two or more includes the quantity of documents that mention the business associated with the first document.

24. A method performed by one or more server devices, comprising:

identifying, using a processor associated with the one or more server devices, a first document and a second document;
determining, using a processor associated with the one or more server devices, that the first document is associated with a first geographic location that is located within a particular geographical area and that the second document is associated with a second geographic location that is located outside of the particular geographic area;

assigning, using a processor associated with the one or more server devices, a first score to the first document based on a combination of two or more of the following factors:
  a score associated with another document that is identified as authoritative for a business associated with the first document,
  a total number of documents referring to the business,
  a highest score associated with the documents referring to the business,
  a total number of documents with reviews of the business, or
  a number quantity of documents that mention the business;

assigning, using a processor associated with the one or more server devices, a second score to the second document based on a distance factor that is related to a measure of distance based on a third geographic location associated with the particular geographical area; and ranking, using a processor associated with the one or more server devices, the first document with regard to at least the second document based on the first score and the second score.

25. The method of claim 24, further comprising:
receiving a search query relating to a local search; and
presenting, in response to receiving the search query, the first document based on the first score and the second document based on the second score.

26. A computer-readable memory device that stores instructions executable by at least one processor, comprising:
  instructions for identifying a first document and a second document;
  instructions for determining that the first document is associated with a first geographic location that is located within a particular geographical area and that the second document is associated with a second geographic location that is located outside of the particular geographical area;
  instructions for generating a first score for the first document based on a combination of two or more of the following factors:
    a score associated with another document that is identified as authoritative for a business associated with the first document,
    a total number of documents referring to the business,
    a highest score associated with the documents referring to the business,
    a total number of documents with reviews of the business,
    a quantity of documents that mention the business,
    a numeric score of a review of the business,
    a function of a plurality of scores of reviews of the business,
    a type of document containing a review of the business,
    a type of language used in a review of the business,
    financial data associated with the business, or
    a number of years that the business has been operational;
  instructions for generating a second score for the second document based on a distance factor that is related to a measure of distance based on a third geographic location associated with the particular geographical area and
  instructions for ranking the first document with regard to at least the second document based on the first score and the second score.

27. The computer-readable memory device of claim 26, further comprising:
  instructions for receiving a search query; and
  instructions for identifying the particular geographical area based on information in the search query.

28. The computer-readable memory device of claim 27, where the instructions for identifying the particular geographical area further includes:
  instructions for representing the particular geographical area by a set of postal codes associated with the particular geographical area.

29. The computer-readable memory device of claim 28, where the instructions for determining that the first document is associated with a first geographic location that is located within the particular geographical area includes:
  instructions for determining a first postal code associated with the first document, and
  instructions for determining that the first postal code is included in the set of postal codes associated with the particular geographical area.

30. One or more computer devices, comprising:
  means for receiving a search query;
  means for identifying an area for the search query;
  means for identifying a first document associated with a geographic location within the area;
  means for identifying a second document associated with a geographic location outside the area;
  means for assigning a first score to the first document based on a plurality of first factors, where each of the plurality of first factors is independent of the search query and independent of a measure of distance, where the plurality of first factors includes two or more of:
    a score associated with another document that is identified as authoritative for a business associated with the first document,
    a total number of documents referring to the business,
    a highest score associated with the documents referring to the business,
    a total number of documents with reviews of the business,
    a quantity of documents that mention the business,
    a numeric score of a review of the business,
    a function of a plurality of scores of reviews of the business,
    a type of document containing a review of the business,
    a type of language used in a review of the business,
    financial data associated with the business, or
    a number of years that the business has been operational;
  means for assigning a second score to the second document based on a distance factor that depends on the measure of distance and not based on any of the plurality of first factors;
  means for ranking the first document and the second document based on the first score and the second score, respectively; and
  means for presenting information regarding the ranked first and second documents.

31. The one or more computer devices of claim 30, where the search query includes information regarding the area; and where the means for identifying the area includes:
  means for identifying the area based on the information in the search query.

32. The one or more computer devices of claim 31, where the means for identifying the area further includes:
  means for representing the area by a set of postal codes associated with the area.

33. The one or more computer devices of claim 32, where the means for identifying the first document includes:
   means for determining a postal code associated with the first document, and
   means for determining whether the postal code is included in the set of postal codes associated with the area.

34. The one or more computer devices of claim 30, where the means for identifying the area includes:
   means for receiving input regarding a map, and
   means for providing the map within a map window, where the area represents a visible part of the map in the map window.

35. The one or more computer devices of claim 34, where the means for identifying the area further includes:
   means for identifying a set of latitude and longitude coordinates associated with the visible part of the map, and
   means for representing the area by the set of latitude and longitude coordinates.

36. The one or more computer devices of claim 35, where the means for identifying the first document includes:
   means for determining a latitude and longitude coordinate associated with the first document, and
   means for determining whether the latitude and longitude coordinate is included in the set of latitude and longitude coordinates representing the area.

37. The one or more computer devices of claim 30, where the means for assigning the first score to the first document includes:
   means for determining a score for the first document based on the highest score associated with documents referring to the business associated with the first document.

38. The one or more computer devices of claim 30, where the means for assigning the first score to the first document based on the plurality of first factors includes:
   means for scoring the first document based on the plurality of first factors and the distance factor.

39. The one or more computer devices of claim 30, further comprising:
   means for receiving, from a user, identification of selected factors to use for the plurality of first factors; and
   where the means for assigning a first score includes means for assigning the first score to the first document based on the selected factors.

40. The method of claim 1, further comprising:
   providing an option to turn off the location prominence factor;
   receiving selection of the option; and
   assigning scores to the first and second documents based on the distance factor and not based on the location prominence factor in response to receiving the selection of the option.

* * * * *